Figure 1:
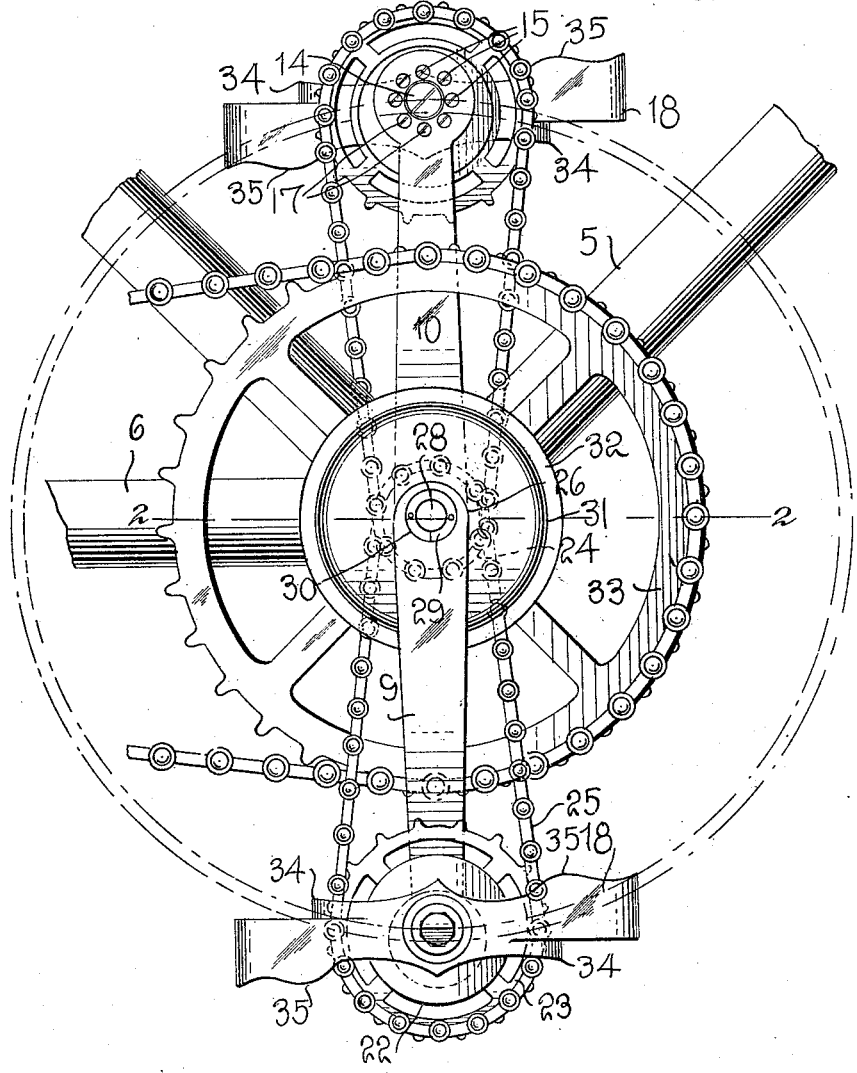

Inventor
ARTHUR BOYD

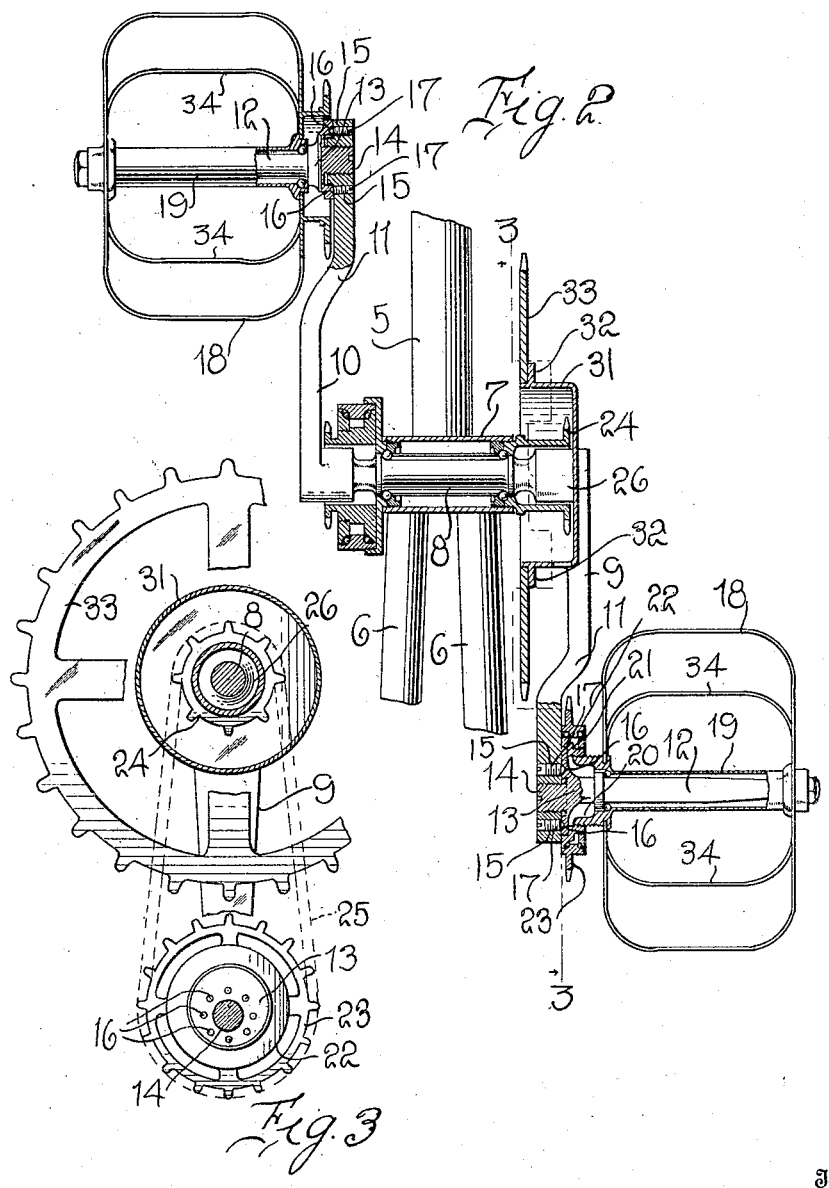

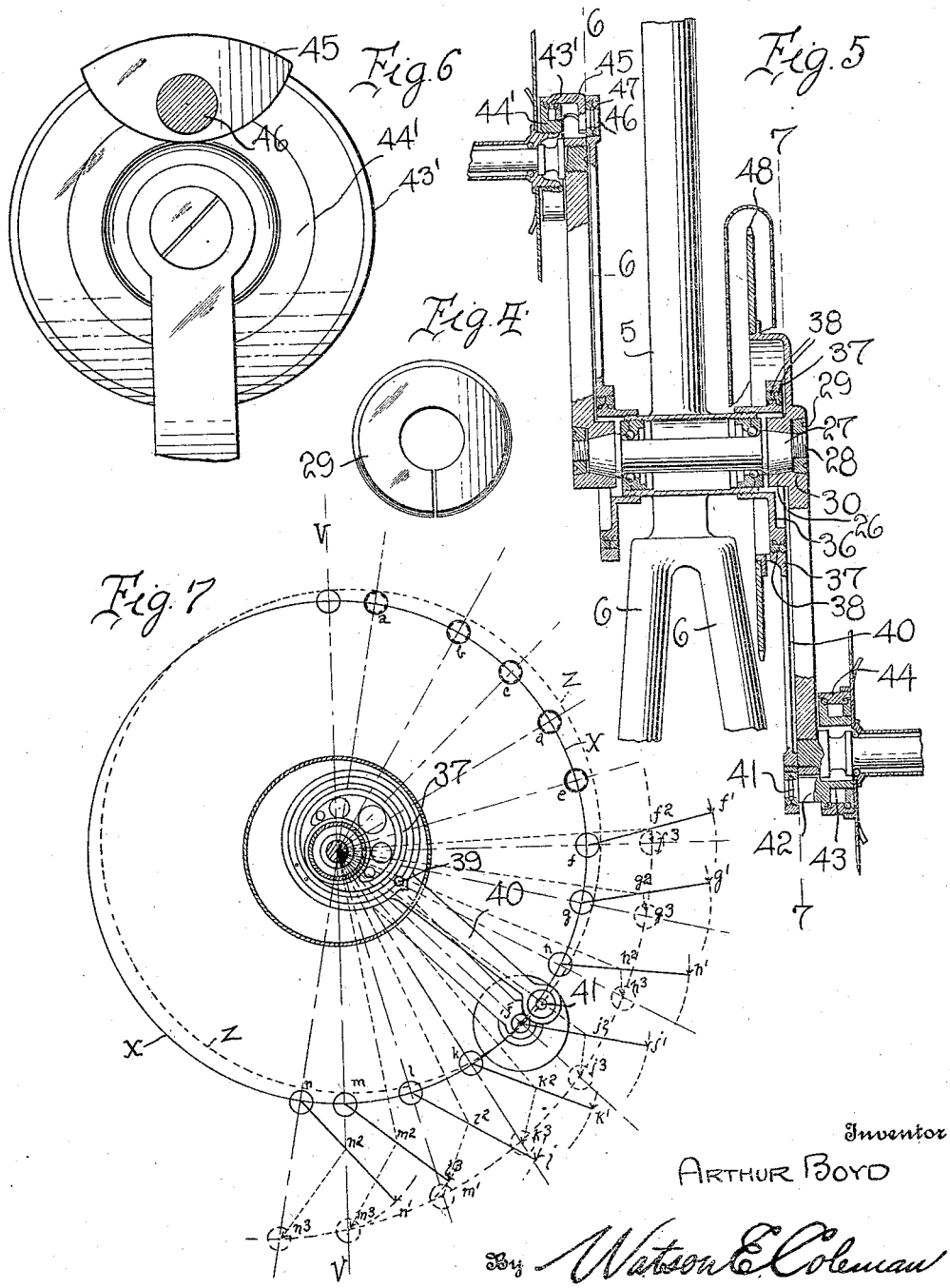

UNITED STATES PATENT OFFICE.

ARTHUR BOYD, OF WEST HARTLEPOOL, ENGLAND.

PROPELLING MECHANISM FOR VEHICLES.

1,211,911.   Specification of Letters Patent.   Patented Jan. 9, 1917.

Application filed August 28, 1915. Serial No. 47,877.

*To all whom it may concern:*

Be it known that I, ARTHUR BOYD, a subject of the King of England, residing at West Hartlepool, in the county of Durham, England, have invented certain new and useful Improvements in Propelling Mechanisms for Vehicles, of which the following is a specification, reference being had to the accompanying drawings.

This invention relates to propelling mechanism for vehicles, upon which an application for patent, numbered 19,424, was filed in Great Britain on September 4, 1914.

The present invention relates to certain further developments of the invention forming the subject-matter of United States Patent No. 1,126,947, granted to me February 2, 1915, and while the several advantages referred to in the above mentioned patent are retained in the improved construction, the latter also results in greater mechanical efficiency and an increase in effective leverage for the purpose of driving the vehicle.

It is one of the principal objects of the improved construction to provide means whereby the effective leverage for the propulsion of a pedal-operated crank shaft may be carried through and beyond the normal lower dead center position of the crank arm, the construction and arrangement of the several coöperating elements, whereby this end is accomplished, being considerably reduced in number from the original embodiment of the invention disclosed in the patent referred to, which results in a corresponding reduction in weight of the machine.

It is one of the more specific objects of my invention to provide a more direct connection between the pedal clutch and the dead gear on the crank bracket than was originally proposed in the chain type, the pedal in the present case being mounted upon a solid crank pin, and means for adjusting said pin upon the crank arm so as to effect a tightening of the chain connection when the same becomes slack through wear or other causes.

The invention has for another important object to provide improved means for effecting a locking adjustment between the crank arm and the shaft.

It is a further general object to provide in the improved construction, various other specific mechanical improvements over my original invention so that the mechanism, as a whole, is rendered more durable and the several parts thereof readily adjustable when necessary, while the desired effective increase in leverage is obtained with a minimum of effort upon the part of the rider.

With the above and other objects in view, my invention consists in the novel features of construction, combination and arrangement of parts to be hereinafter more fully described, claimed and illustrated in the accompanying drawings, in which, Figure 1 is a side elevation of a portion of a bicycle, illustrating one embodiment of my improved propelling mechanism; Fig. 2 is a sectional view taken on the line 2—2 of Fig. 1; Fig. 3 is a sectional view taken on the line 3—3 of Fig. 2; Fig. 4 is an enlarged side elevation of one of the lock nuts for the crank arms; Fig. 5 is a vertical section similar to Fig. 2, illustrating a slightly modified construction; Fig. 6 is a section taken on the line 6—6 of Fig. 5; and Fig. 7 is a section taken on the line 7—7 of Fig. 5 wherein I have diagrammatically illustrated the manner in which the increase in leverage effected through the medium of the eccentric pedal connection, is transmitted to the crank.

Referring now more particularly to Figs. 1 and 2 of the drawings, 5 designates the lower diagonal tube of a bicycle frame, and 6 designates the rear converging frame bars. At the union of the bars 5 and 6 with the saddle post or pillar (not shown), a crank bracket or bearing is formed. This bracket consists of a shell 7 within which the crank shaft 8 is mounted to rotate, said shaft being supported by suitable anti-friction bearings in any well known or approved manner.

9 and 10 designate the crank arms which are attached to the respective opposite ends of the shaft 8, as will presently be described. Each of these crank arms is offset, as at 11, so that the outer end of the arm will be disposed inwardly of the plane of the body portion thereof which is connected at its extremity to the crank shaft.

12 designates the solid metal crank pins, and each of these pins has an enlarged head 13 formed upon one of its ends. The outer face of said head is recessed and, upon this recessed face, the threaded stud 14 is integrally formed. It will be observed that this stud is eccentrically disposed with relation to the axial center of the crank pin 12. The outer end of each crank arm is provided with a threaded opening to receive the stud 14 of one of the crank pins, and a circular series of relatively small openings 15 are formed in the crank arm around this stud receiving opening and are equidistantly spaced. The flange on the head 13 of the crank pin is provided in its side face with a circular series of conical recesses 16 disposed in concentric relation to the stud 14. These recesses are adapted to receive the tapered inner ends of the set pins 17 which are threaded in the openings 15 of the crank arm. It will thus be seen that the crank pin is absolutely fixed in position and held against turning movement with respect to the crank arm upon which it is mounted.

Upon the crank pins 12, the pedals 18 are loosely mounted for turning movement. As shown in Fig. 2, the pedal on the right hand side of the machine is provided with a metal sleeve 19 which is supported by ball bearings upon the crank pin 12, and on the inner end of this sleeve 19, a hollow, exteriorly threaded, cylindrical enlargement 20 is integrally formed. Upon this enlargement, a flanged annulus 21 has threaded engagement, said annulus constituting the stationary element of a clutch. The relatively movable clutch ring 22 has integrally formed therewith the sprocket wheel 23. Clutch pawls may be utilized as in the construction shown in my prior patent, whereby the pedal will be clutched to the sprocket wheel 23 in the oscillating movement of the pedal in one direction, or if desired, roller clutch members may be used. To the end of the bracket shell in which the crank shaft 8 is mounted, the fixed or dead sprocket wheel 24 is secured. By providing the crank arms with the offsets 11, the sprockets 23 are in direct alinement with the sprocket wheels 24. These sprocket wheels 23 and 24 are connected by means of the endless sprocket chains 25. Such slack as may occur in this chain, incident to wear, can be readily taken up by simply removing the threaded pins 17 and then turning the eccentrically disposed stud 14 in the opening of the crank arm, thereby changing the position of the crank pin and pedal with respect to the arm and shifting the sprocket wheel 23 bodily in a rearward direction so that the chain will be again tightened. By then replacing the pins 17, the crank pin 12 will be securely held in position against further turning movement, as clearly shown in Fig. 5, the inner end of each of the crank arms 9 and 10 is formed with a hollow boss 26. This boss is provided with a tapered bore to receive a correspondingly tapered end 27 of the crank shaft 8. An eccentrically disposed threaded stud 28 projects outwardly from the smaller end of this tapered section of the crank shaft and, upon the same, a split nut 29 is adapted to be engaged. This nut fits within a recess 30 in the outer face of the crank arm. The wall of this recess, as well as the perimeter of the nut, is inwardly tapered, as clearly shown in Fig. 5, so that when the nut is threaded inwardly into frictional engagement with the recess 30, it is gradually contracted and caused to bind tightly upon the threads of the stud 28. Thus, relative movement of the shaft and the crank arm, due to wear upon the threads, will be effectually overcome. Upon the boss 26 of the crank arm 9, an inwardly projecting hollow cover or casing 31 is integrally formed and has its edge flanged, as at 32, and riveted to the main driving sprocket wheel 33. Thus, when the crank arm is attached to the shaft in the manner above described, the proper relative positions of the several sprocket wheels for the most direct transmission of power to the driving chain, is at once obtained, and relative axial shifting movement of the sprocket wheels precluded in the operation of the mechanism.

For the crank arm at the left hand side of the machine, shown in Fig. 2, the clutch device whereby the leverage is transmitted from the pedal to the crank shaft, is mounted at the inner end of the crank arm. The ratio between the sprockets 23 and 24 may be varied as desired. I have shown the pedal on the right hand side of the machine in Fig. 2, so geared to the crank shaft of the machine that the clutch will be slow in its operation, whereas, by the arrangement shown on the opposite side of the machine, the clutch operates at double speed, as it is arranged in connection with the smaller sprocket wheel provided at the inner end of the crank arm. In this latter arrangement, the clutch is more sensitive in its action and there will be less lost motion at the pedal. This is particularly advantageous in the use of a ratchet clutch.

Particular attention is now directed to Fig. 1 of the drawings, wherein I have shown the manner in which the rider's shoe or boot fits upon the pedal. This pedal is constructed of heavy sheet metal, and in the same, the ends of the sleeve 19 are suitably secured. Adjacent to each end of the pedal and upon the relatively opposite sides thereof, a transversely extending raised stop bar or kerb 34 is provided, against which the inner face of the heel of the shoe is adapted to abut, the bottom face of the heel bearing upon the upper edge of the main body plate of the pedal. It is to be observed that, when the foot is in engagement with the pedal, the stop bar or kerb 34 is disposed rearwardly of the axis of the pedal. The longitudinal edges of the body plate of the pedal at opposite sides thereof and forwardly of the pedal axis, are provided with upstanding lugs or ears 35 between which the sole of the shoe is adapted to fit, whereby the foot is held against transverse shifting movement upon the pedal. The pedal is reversible, and when the foot is placed in position thereon, the leverage power is transmitted through the pedal to the crank shaft with a minimum of strain upon the ankle of the rider. The pressure is exerted upon the forward end portion of the pedal, and assuming that this point is one-half the radius between the crank and the pedal pin, the effective increase in leverage, with the ratio of the sprocket wheels 23 and 24 as 2 to 1, will be only one half of the apparent increase in leverage because the angular velocity of the pedal is only one-half that of the crank pin. The ratio of this leverage increases as the pedal travels downwardly, because the angle of the pedal with respect to the crank arm decreases.

In Figs. 5 and 6 of the drawings, I have shown a modified construction, wherein the flexible connecting chain 25 is eliminated, and in lieu thereof a fixed or dead eccentric 36 is threaded or otherwise connected to one end of the crank bracket shell. An eccentric strap 37 is provided with removable ball raceway sections 38, held in place by a set screw 39, two series of anti-friction bearing balls being interposed between the raceways and the periphery of the eccentric 36. A rod or arm 40 is integrally formed at one of its ends with the eccentric strap 37 and has its other end connected by the ball bearing, indicated at 41, to a stud 42 projecting inwardly from the section of the clutch casing 43 which loosely surrounds the crank pin 12. The outer annular section 44 of the clutch is detachably connected to the pedal 18. It will be understood, of course, that pawls or rollers are interposed between the relatively movable case sections 43 and 44 so that the same are locked together for unitary rotation upon an oscillating movement of the pedal in one direction. The crank arm in this modified construction is connected to the crank shaft in the manner hereinbefore described, and also provided with the driving sprocket wheel. The eccentric arm or rod 40 works through an opening in the annular wall of the cover or housing 31, as does also the connecting chain 25 disclosed in the preferred embodiment of the invention.

At the outer end of the left hand crank arm in Fig. 5, I have shown a slightly different manner of connecting the eccentric arm 40 to the pedal clutch. With this arrangement, I provide upon the outer annular section 43' of the clutch case, a laterally and inwardly projecting lug 45, the extremity of which is longitudinally extended inwardly toward the crank arm and carries a stud 46 upon which the outer end of the eccentric arm is mounted and provided with the ball bearing shown at 47. In this alternative construction, the outer annular clutch section 43' is not connected to the pedal, but the pedal sleeve is threaded into the inner section 44' of the clutch. In connecting the eccentric arm to the outer clutch member in this manner, a certain amount of stress is, of course, applied in an oblique line which would have a tendency to twist the clutch. However, in so far as this stress occurs only when the clutch dogs or rollers come into action, no trouble is experienced, the relative movement of the outer casing section taking place only when the clutch is out of operation.

The use of the eccentric connection between the pedal clutch and the crank bracket in lieu of a flexible connecting chain, enables me to provide a protecting case for the driving sprocket and the driving chain, as indicated at 48 in Fig. 5.

In Fig. 7 of the drawings, I have shown, by means of a diagram, the action of the pedal and the manner in which an increased leverage is transmitted to the crank shaft. In this view, V indicates the vertical central line through the crank, and the circle X indicates the path of travel of the crank pin upon which the pedal is mounted, while the circle Z designates the path of travel of the stud or pin 42, to which the outer end of the eccentric arm 40 is connected. The dotted radial lines indicate various positions of the crank arm, the small circles lettered $a$ to $n$, respectively, representing the pedal pins. The lines $f\ f'$, $g\ g'$, $h\ h'$, etc., indicate the centers of the pedal during the working stroke. The power is assumed to act from the forward extremity of the pedal and, as the pedal has only one-half of the angular velocity of the crank at the points $f$, $g$, $h$, etc., only one-half of this extra leverage is capable of addition to the crank. This added leverage is represented by $f\ f^2$, $g\ g^2$, $h\ h^2$, etc., and as the force which is applied to the pedal is normal to the face or central line of the pedal, this force acts along the lines $f^2\ f^3$, $g^2\ g^3$, $h^2\ h^3$, etc., and cuts through an imaginary line extended from the axial center of the crank arm. Thus, the effective length of the crank is practically extended from the points, $f$, $g$, $h$, etc., to the points $f^3$, $g^3$, $h^3$. This is due to the locking of the pedal upon the crank arm, through the medium of the clutch and eccentric connection, to the crank bracket. Of course, the actual working leverage of the ordinary crank arm would be on the circle X, whereas, in the present invention, this working leverage from the vertical line V—V will be at the points $f^3$, $g^3$, $h^3$, etc. It is, however, quite optional with the rider whether or not he will angle his foot to dispose the pedal in the several positions illustrated, as the driving gear or sprocket will continue to revolve while the clutch pedal connection will act immediately when necessity requires that additional driving force be transmitted to the crank in order to ascend an inclined grade or when, for other reasons, it may be desired to accelerate the speed of the machine. Now it will be observed, from the diagram, that the pedal pin of the upper crank is moved from a point on the line V—V to the point $a$, but the lower pedal is out of action, the pedal pin on the lower crank being at the point $n$. The lower pedal is traveling downwardly at the point $n^2$ at the same rate as the crank pin is traveling upwardly at the point $n$. This will be the lower dead center in the path of movement of the pedal. On the other hand, the ordinary crank, without my improvement, when it reaches the point $m$, is dead to all vertically applied forces. With my improved mounting of the pedal on the crank arm and the gear connection to the crank bracket, when the arm is at this point $m$, the force applied to the pedal acts in the direction of the line $m^2$, $m^3$, the latter point being on the vertical central line V—V. Thus, there is a horizontal twisting or driving moment from the point $m^2$ to this central vertical line. It will, therefore, be understood that, before the propulsive effort on the lower pedal entirely ceases by the crank arm reaching the point $n$, the upper crank has come into action and has started its downward stroke. The additional leverage obtained by my improved pedal mounting and gearing, practically eliminates wasted or unproductive effort upon the part of the rider, and there is a continuous transmission of driving force to the crank shaft through the medium of the oppositely related pedals. It is seen that the added leverage which is obtained and transmitted to the pedal from the crank, operates only during the latter half of the downward stroke of the pedal. The reduced angular velocity of the pedal is constantly varying in the working stroke thereof.

It will be seen that the advantages resulting from the arrangement of the several parts above referred to, is that the working stroke of the crank is increased and carried beyond the lower dead center, the opposite or upper crank being brought into position for effective driving leverage before the lower crank is dead or out of effective leverage; one of the cranks is at all times available for immediately transmitting driving power to the crank shaft, and finally the tension upon the driving chain is, at all times, constant throughout each revolution so that more power may be developed.

From the foregoing description, taken in connection with the accompanying drawings, it is believed that the construction, manner of operation and several advantages of my invention will be clearly and fully understood. The invention, in the several forms which I have illustrated in the accompanying drawings, is relatively simple and provides a mechanism whereby bicycles and analogous riding vehicles may be easily operated or driven with a minimum of manual exertion. The several parts are easily accessible and the cranks may be readily removed from the ends of the crank shaft or quickly and accurately replaced in position thereon.

While I have shown and described what I believe to be the preferred embodiments of my invention, it is to be borne in mind that the same is susceptible of still further modification and I, therefore, reserve the privilege of adopting all such legitimate changes as may be fairly embodied within the spirit and scope of the invention as claimed.

Having thus fully described my invention, what I desire to claim and secure by Letters Patent is:—

1. Means for increasing the leverage of the crank arm of a pedal driven vehicle, including a bracket, a crank shaft journaled therein, an arm on each end of the crank shaft, each of said arms having its outer end inwardly offset, a pedal mounted to turn upon the offset end of each arm, a floating clutch member, a movable connection between the same and the crank bracket, and a clutch member adapted to coöperate with the floating clutch member and reduce the angular velocity required to indirectly lock the pedal to the crank.

2. Means for increasing the leverage of the crank arm of a pedal driven vehicle, including a bracket, a crank shaft journaled in said bracket, a crank arm fixed to each end of said shaft, a crank pin having an eccentric stud mounted in the outer end of each arm, a pedal loosely engaged on said pin, a clutch member carried by said pedal, a second clutch member movable upon the first clutch member, a flexible connection between the latter clutch member and the crank case adapted to reduce the angular velocity required to indirectly lock the pedal to the crank, and means for locking the crank pin in an adjusted position upon the crank arm to tension said flexible connection.

3. The combination with a crank bracket, of a crank shaft journaled therein, a crank arm fixed upon each end of said shaft, a crank pin having an eccentrically disposed threaded stud on one end removably mounted in the outer end of each arm, said pin being provided with a flange at the inner end of said stud having a circular series of recesses in its face concentrically disposed with respect to the stud, set pins threaded in the arm for engagement in said recesses to lock the crank pin in an adjusted position on the arm, a pedal mounted to turn on the crank pin, a gear fixed upon the crank bracket, a clutch carried by the pedal, and a flexible connection between the movable part of the clutch and said fixed gear.

4. Means for increasing the leverage of the crank arm of a pedal driven vehicle including a crank shaft, a crank arm fixed to each end of said shaft, a crank pin for each of the arms, a pedal loosely mounted thereon, a dead wheel concentric to the crank shaft, a rotatable element having its axis coincident with the crank pin, a movable connection between said rotatable element and the dead wheel, means for locking the rotatable element to the pedal during the working stroke of the crank arm, and means for adjusting the crank pin longitudinally upon the crank arm.

5. Means for increasing the leverage of the crank arm of a pedal driven vehicle including a crank shaft, a crank arm fixed to each end of said shaft, a crank pin for each of the crank arms, a pedal loosely mounted theron, a dead wheel concentric to the crank shaft, a rotatable element having its axis coincident with the crank pin, a movable connection between said rotatable element and the dead wheel, means for locking the rotatable element to the pedal during the working stroke of the crank arm, and means for mounting and adjusting the crank pin eccentrically with respect to a fixed point on the crank arm.

In testimony whereof I hereunto affix my signature in the presence of two witnesses.

ARTHUR BOYD.

Witnesses:
H. C. NIELSEN,
JOHN W. WALTER.

Copies of this patent may be obtained for five cents each, by addressing the "Commissioner of Patents, Washington, D. C."